Feb. 11, 1969    M. W. NICHOLAS    3,426,776
METHODS AND APPARATUS FOR STORAGE AND TRANSPORTATION
OF VOLATILE MATERIALS
Filed Nov. 22, 1966
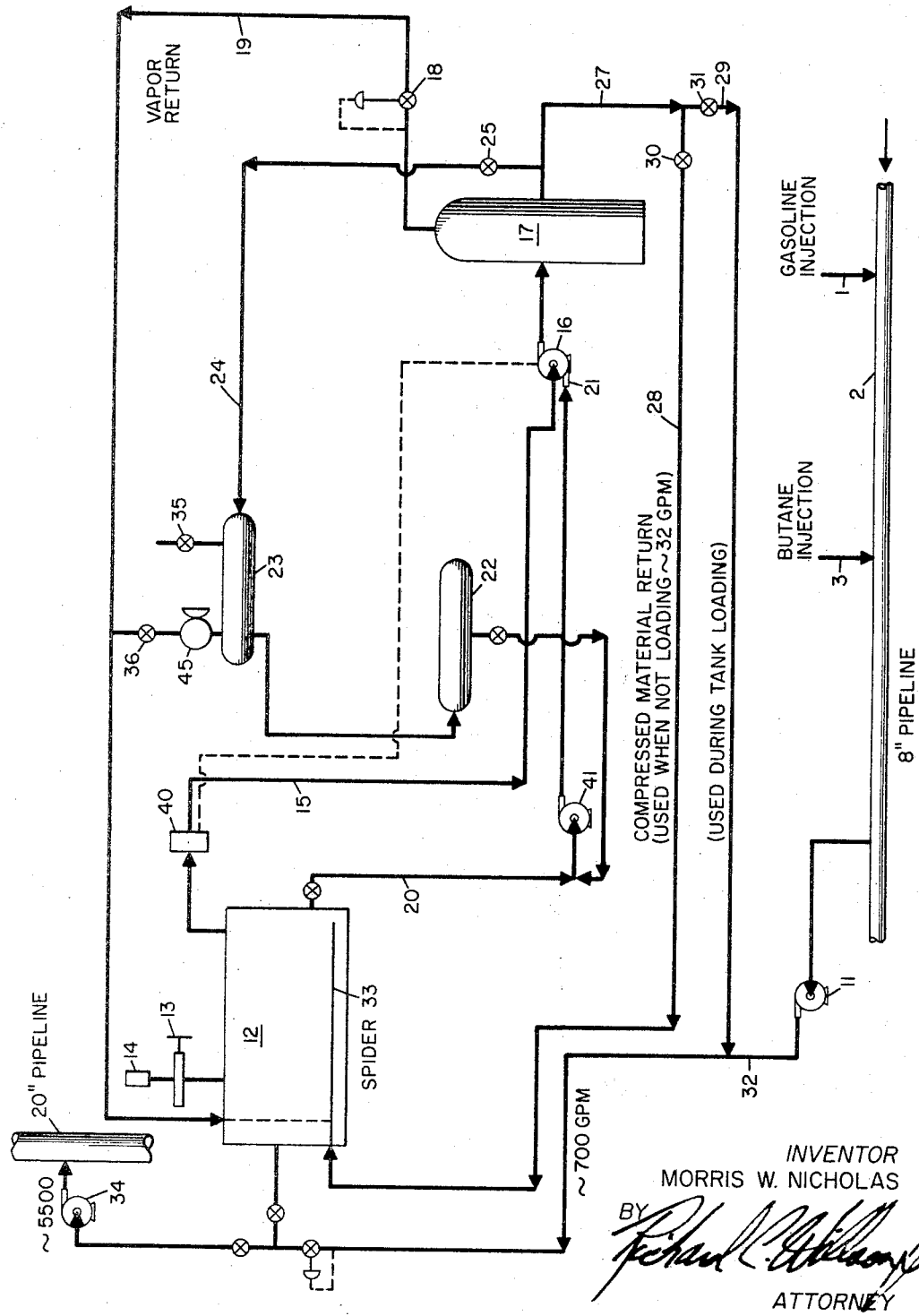
INVENTOR
MORRIS W. NICHOLAS
ATTORNEY

United States Patent Office 3,426,776
Patented Feb. 11, 1969

3,426,776
METHODS AND APPARATUS FOR STORAGE AND TRANSPORTATION OF VOLATILE MATERIALS
Morris W. Nicholas, Findlay, Ohio, assignor to Marathon Oil Company, Findlay, Ohio, a corporation of Ohio
Filed Nov. 22, 1966, Ser. No. 596,277
U.S. Cl. 137—12                                10 Claims
Int. Cl. F17d 1/16; B67d 5/60

The present invention relates to new methods for the storage and transportation of volatile materials and to related apparatus, and in preferred embodiments, relates to the application of such methods and apparatus to points of juncture between larger and smaller pipelines transporting volatile fluids.

Most sources of hydrocarbons produce a certain amount of butane, propane and pentanes. For maximum economy, it is desirable that these more volatile hydrocarbons be transported in the same systems in which the less volatile higher hydrocarbons are transported. By admixing the more volatile lower hydrocarbons with the higher hydrocarbons, mixtures having Reed vapor pressures of from about five to about 52 p.s.i. can be obtained. Most commercial pipelines can withstand such pressures and are suitable for moving such mixtures. However, the storage tanks which form a part of the pipeline systems often cannot withstand such pressures. Where transportation of the mixtures can be accomplished without any storage being necessary, little or no problem exists. But many large long-distance pipelines have minimum injection rates at which materials must be fed into the pipeline. Where such large pipelines are to be fed by smaller pipelines which have maximum capacities below the minimum injection rate for tne large pipeline, some means of accumulating material is required. While such accumulation of higher pressure materials could be provided by the construction of special high pressure tanks, such tanks would find only intermittent use and would necessarily be expensive. The present invention permits the use of the common "cone-roofed" and similar low working pressure tanks for the storage of relatively volatile hydrocarbon mixtures. Therefore, the present invention permits the transportation of these volatile mixtures without the need for extensive capital investment in specialized storage tanks.

The invention will be better understood by reference to the descriptions of preferred embodiments which follow.

The drawing is a schematic diagram of a preferred embodiment of the present invention.

In the drawing a source of gasoline, e.g., a gasoline plant located near an oil field, 1 feeds gasoline into an eight inch pipeline 2 having a maximum total flow capacity of about 42,000 gallons per hour. A source of butane 3 located some distance from the gasoline source feeds butane into the pipeline 2 where the butane mixes with the gasoline forming a mixture containing about fifty-two percent butane and having a Reed vapor pressure of about 32 pounds per square inch. This mixture then flows through the eight inch pipeline 2 until the mixture reaches the vicinity of a twenty inch high capacity transcontinental pipeline.

At this point a loading pump 11 draws hydrocarbons having a Reed vapor pressure of about 32 p.s.i. from an eight inch pipeline and discharges into a cone-roofed storage tank 12 equipped with a safety release valve 13 capable of protecting the cone-roofed tank against excessive vacuum or pressure. In most cases the cone-roof tank will not be built to any pressure vessel code requirements and will be capable of withstanding pressures of only about two pounds per square inch gage and only very moderate vacuums of perhaps less than about five inches of mercury. The safety valve discharges excessive hydrocarbon vapors to a flare 14 where they can be burned. Also connected to the top of the tank is a vapor line 15 which conducts vapors from the tank to the suction side of a Nash pump 16. This Nash pump in turn, discharges into separator 17 and the vapors from separator 17 are conducted through pressure regulator 18 into vapor return line 19 which returns the vapors to the tank 12.

The Nash pump 16, which is preferred for the purposes of the present invention, comprises a round rotor with curved blades forming a series of chambers open at the bottom which revolves freely in an elliptical casing partially filled with a sealant liquid. As the rotor revolves, it carries the liquid with it, resulting in a solid liquid ring revolving in the casing at the same speed as the rotor. Since the casing is elliptical and the rotor round, the liquid must alternately enter and fill the chambers and then leave them in a continuous cycle. At points where the liquid leaves the rotor chambers it draws in vapors through the pump inlet. As the liquid is forced out by the converging casing to re-enter the rotor chambers the vapor in the chambers is forced out through ports which are connected with the pump outlet. This pump is produced by the Nash Engineering Company of South Norwalk, Conn.

The sealant for the purpose of the present invention is preferably provided by withdrawal of hydrocarbons from the bottom of storage tank 12. These hydrocarbons flow through line 20 into the sealant inlet 21 of the Nash pump. If desired, a secondary sealant storage tank 22 may be filled with water, naphtha, or other sealant for utilization when storage tank 12 is empty. Water is especially preferred as a secondary sealant because it is immiscible with butane and other hydrocarbons and is easily and virtually completely separated from the butane by drawing the water off through a drain on butane storage tank 23. This tank (which can be a wheeled transport) is designed for at least the pressure of the vapor pressure of the more volatile components at the highest ambient temperature to be encountered. A line 24 connects the butane storage tank with the liquid section (bottom) of the separator 17. This line 24 is controlled by valve 25 located near the outlet of separator 17. A second line 27 runs from the outlet of separator 17 to either of two lines 28 and 29 respectively. Line 28 controlled by valve 30 connects the outlet of separator 17 with the bottom of storage tank 12. L:ne 29 controlled by valve 31, connects the outlet of separator 17 with the loading line 32 which runs between the discharge of loading pump 11 and the inlet of storage tank 12.

Line 28 is preferably connected to a "spider" 33 (diffuser constructed of perforated pipe and located near the bottom inside storage tank 12). An unloading pump 34 connects the storage tank to a twenty inch pipeline.

A fill valve 35 located on butane tank 23 permits filling of the tank from butane tank trucks or from a butane line. A cross-connection between butane tank 23 and vapor return line 19 is controlled by valve 36.

The operation of the system is most readily understood by individual description of the four distinct modes of operation of the system. These are: the tank loading operation, the tank unloading operation, long term storage where the storage tank is nearly full of liquid, and long term storage where the storage tank is nearly full of vapor. Each of these modes of operations will be described individually below.

*Loading of storage tank*

Storage tank 12 is loaded by pump 11 drawing hydrocarbons having the unusually high predetermined vapor pressures described above from a small pipeline, e.g., eight inch diameter, at a rate of, for example, 1,000 barrels per hour. Loading is done through line 32 discharging into storage tank 12. As the liquid level in storage tank 12 rises, the vapor originally in the storage tank consisting primarily of butane compresses, increasing the pressure in the tank. At a predetermined pressure (e.g., ⅞ of an inch of water pressure) Nash pump 16 is automatically started by pressure switch 40 located on vapor line 15 connected to the top of the storage tank.

The Nash pump begins to withdraw vapors, preventing further increase in the pressure within storage tank 12. The Nash pump then continues to operate until the pressure in storage tank 12 is reduced to a preset minimum (e.g., 0.5 inch of water vacuum) at which point switch 40 cuts off the Nash pump 16.

During operation, the Nash pump 16 discharges a mixture of liquified vapor and vapor into separator 17. Simultaneously seal pump 41 withdraws hydrocarbons from the bottom of storage tank 12 and provides them to the Nash pump 16 as sealant.

The vapor from separator 17 returns through line 19 to the vapor space in storage tank 12. The liquid from separator 17 flows through lines 27 and 29 into loading line 32 where it mixes with the hydrocarbons being loaded into the tank.

Nash pump 16 will ordinarily be of the general size range of about 450 cubic feet per minute capacity of hydrocarbons under the conditions described above when the pump is used in conjunction with a storage tank 12 having a capacity of about 55,000 barrels. A driver motor of from about 50 to about 150 horsepower would normally be employed with a tank and pump of this size.

Where the material coming from the smaller pipeline into pump 11 and then into storage tank 12 is of relatively high vapor pressure due to excessive entrainment of $C_1$ to $C_3$ hydrocarbons or due to premixing of excessive amounts of butane, the Nash pump 16 will be unable to control the pressure in storage tank 12 even when it operates continuously during loading. In such instances, overpressurization of storage tank 12 is prevented by safety valve 13 discharging vapor into flare 14. Because of the lower vapor pressure and greater solubility of butane in the hydrocarbons being admitted to storage tank 12, the vapors which are burned in flare 14 will consist primarily of methane, ethane and propane.

*Unloading of storage tank into pipeline*

In most commercial pipeline having diameters in the range of twenty inches or larger, a minimum rate of injection of a charge into the pipeline must be observed. For example, in some twenty inch pipelines, the charging rate must be at least 5,400 barrels per hour. Since it is impossible to move this material at this rate through small pipelines, e.g., an eight inch pipeline, it is necessary that there be an accumulation of material at the point of junction between a smaller and a larger pipeline. At such juncture points there are commonly available cone-roofed tanks of the variety described as storage tank 12. Such cone-roof tanks are used for the storage of the hydrocarbons more commonly moved in pipelines, i.e., gasolines, kerosenes, fuel oils, etc. Construction of special pressure vessels for accumulation of higher vapor pressure hydrocarbons such as gasoline containing up to about 20 to 50% butane would require relatively large capital investments and such tanks would be used only intermittently. Therefore, it is a major advantage of the present invention that by use of the techniques herein disclosed, cone-roof tanks widely available in pipeline systems, may be employed to store relatively high Reed vapor pressure hydrocarbons with comparatively slight modifications.

Under such high unloading rates, unless desirable air were admitted to the vapor space of tank 12, pressure in the tank would be reduced and butane would be preferentially (as compared to the heavier hydrocarbons) flashed into the vapor phase. Since one of the purposes of the present invention is to permit the moving of substantial amounts of butane admixed with heavier hydrocarbons, it is important to avoid this flashing effect.

To accomplish this, during unloading, butane from butane tank 23 (a relatively small tank having a capacity of approximately 1000 barrels or even less) is pumped by pump 45 into vapor return line 19 through which it flows to the vapor space of tank 12. If necessary, a vaporizer heated by steam, hot water or electricity can be inserted on the discharge of pump 45 to assist in vaporizing butane. During this operation, the Nash pump 16, separator 17, and lines 27, 28 and 29 are all idle.

*Storage with tank nearly liquid full*

In many instances, it will be possible to transfer into a larger pipeline almost as soon as storage tank 12 has been filled. However, in other cases, it will be necessary, due to scheduling on the larger pipeline, or for other reasons, to store liquid hydrocarbons in storage tank 12 for 24 hours or even longer periods.

During cold weather storage, or where temperatures are decreasing, as during the night, the principal concern is to prevent the drawing of a vacuum on storage tank 12. While the tank itself is protected against damage by internal vacuum through the means of safety valve 13 which acts as a vacuum release valve, it is important that safety valve 13 not be actuated since this would draw in objectionable quantities of air into the hydrocarbons contained within the tank. To prevent this, an automatic control on pump 45 is actuated when a very slight vacuum, e.g., one half inch is present within storage tank 12. Pump 45 then responds by pumping butane into vapor reached in line 19 causing an increase in the pressure within storage tank 12.

In periods of increasing temperatures, e.g., in daytime, the principal concern is to prevent overpressure of storage tank 12 with consequent loss of materials through safety valve 13 and flare 14. This is accomplished by the automatic operation of Nash pump 16 controlled by pressure switch 40 which starts the pump when the pressure in storage tank 12 decreases to a preset level, e.g., about one inch of water pressure. During this operation the Nash pump discharges into separator 17 and the vapors in the top of the separator go through vapor return line 19 into the top of storage tank 12. The liquid from the bottom portion of the separator flows through line 27 into line 28 (valve 31 being closed) and thence back through spider 33 located near the bottom of the storage tank. The liquid butane mixture thus moves upward through the storage tank contacting the less volatile hydrocarbons in the tank and is largely absorbed in the less volatile hydrocarbons.

*Storage with tank nearly full of vapor*

When the storage tank is nearly full of vapor, e.g., between deliveries of hydrocarbons from the smaller pipeline, a sealant immiscible with hydrocarbons, most preferably water, is used in conjunction with the Nash pump 16. This sealant flows from tank 22 into the sealant inlet 21 of the Nash pump. As before, the Nash pump operates when the storage tank 12 exceeds a certain preset pressure and the pump is controlled by pressure switch 40. Also, as before, vapor from the separator 17 moves through line 19 back into the vapor space of storage tank 12. The liquid from separator 17, in this instance, is moved through line 24 into the small butane tank 23. This liquid consists of butane with some amount of water sealant ejected by the Nash pump. This water settles to the bottom of the butane tank and may be capped off through a line either to waste or returned to sealant tank 22.

During periods of cooling when the tank is nearly vapor full, butane is injected by means of pump 45 as described above, under Storage With Tank Nearly Liquid Full.

The apparatus of the present invention is also useful in conjunction with other hydrocarbons having lower vapor pressures. For example, in areas where air pollution is a major concern, the systems of the present invention can be utilized to prevent both intake of air and venting of hydrocarbons under all normal circumstances.

It will be understood by persons skilled in the art, that the invention is susceptible to a wide variety of variations and modifications and all such apparent variations and modifications are intended to be included within the claims appended hereto. For example, the Nash pump may be replaced with a compressor with a suitable oil separator or without the need for any sealant return system. The storage tank may be of any geometric configuration, the volatile material utilized herein need not be higher hydrocarbons which have been injected with butane, but may instead be other materials which approximate in their vapor pressures the desired working pressure of the storage tank in which they are to be accumulated.

What is claimed is:

1. A system for the transportation of a highly volatile material and of a less volatile material successively through a smaller pipeline and a larger pipeline while maintaining a minimum rate of injection of materials into said larger pipeline; said system comprising in combination, an inlet to said smaller pipeline connected to a source of lower volatile hydrocarbons and a second inlet to said smaller pipeline for receiving quantities of said more volatile hydrocarbon, a juncture point between said larger and said smaller pipeline, said juncture point being remote from either of said inlets for hydrocarbons; a storage tank having a vapor space and a liquid space and located at said juncture point, said storage tank having a pressure capacity sufficient to contain said less volatile hydrocarbon, but not sufficient to contain said more volatile hydrocarbon, means for loading said storage tank from said smaller pipeline and for unloading said storage tank at said minimum rate into said larger pipeline, and means for withdrawing vapor from the vapor space of said storage tank and returning said vapor or liquid condensed therefrom to the liquid space in said storage tank.

2. The system of claim 1 including a separator and wherein the means for withdrawing vapor from the vapor space of said storage tank and returning said vapor or liquid condensed therefrom to the liquid space in said storage tank comprises a vapor pump which discharges a mixture of vapor and condensed liquid into said separator which separates at least a portion of the condensed liquid for return to the liquid space in the storage tank.

3. The system of claim 1 including a separate tank and wherein at least a portion of the effluent from said means for withdrawing vapor from the vapor space of said tank is fed into said separate tank designed for at least the vapor pressure of said vapors at the highest ambient temperature normally encountered, said vapors being fed into said tank under a pressure sufficient to condense substantially all of said vapors.

4. The system of claim 3 wherein the condensed vapors are fed into the storage tank when the pressure within said storage tank falls below atmospheric pressure.

5. The system of claim 1 wherein the means for drawing vapor comprises a pump which comprises a round rotor with curved blades forming a series of chambers open at the bottom which revolves freely in an elliptical casing partially filled with a sealant liquid so that as the rotor revolves it carries the liquid with it, resulting in a solid liquid ring revolving in the casing at the same speed as the rotor and forcing the vapor in the chambers out through ports which are connected with the pump outlet.

6. The system of claim 5 wherein the sealant liquid is liquid withdrawn from the liquid space of said storage tank.

7. The system of claim 5 wherein the sealant liquid is water, or naphtha.

8. The system of claim 1 wherein the less volatile liquid comprises a major portion of gasoline.

9. The system of claim 1 wherein the more volatile component comprises a major portion of butane.

10. A process for the use of the system of claim 1 comprising in combination the steps of (a) injecting a less volatile hydrocarbon into a smaller pipeline, (b) injecting a more volatile hydrocarbon into said smaller pipeline at a point downstream from the point of injection of the less volatile hydrocarbon so that said more and said less volatile hydrocarbons form a mixture, (c) causing said mixture to flow into a storage tank capable of withstanding the vapor pressure of the less volatile hydrocarbon but incapable of withstanding the vapor pressure of the more volatile hydrocarbon, (d) withdrawing vapors from said storage tank at times when the vapor pressure in said storage tank exceeds a preset maximum pressure, (e) returning said vapors or liquids condensed therefrom to the liquid space in said storage tank, (f) withdrawing liquid from said storage tank at a rate substantially greater than the maximum capacity of said smaller pipeline.

References Cited

UNITED STATES PATENTS

| 2,390,694 | 12/1945 | Coyle | 137—12 XR |
|---|---|---|---|
| 3,035,888 | 5/1962 | Massey | 137—12 XR |
| 3,073,091 | 1/1963 | Kalish | 137—12 XR |
| 3,144,036 | 8/1964 | Rice | 137—12 |
| 3,230,688 | 1/1966 | Kitchen et al. | 137—12 XR |
| 3,265,080 | 8/1966 | Young et al. | 137—12 |
| 3,298,383 | 1/1967 | Cooper | 137—3 |

JOHN PETRAKES, Primary Examiner.

U.S. Cl. X.R.

137—7